United States Patent Office 3,382,646
Patented May 14, 1968

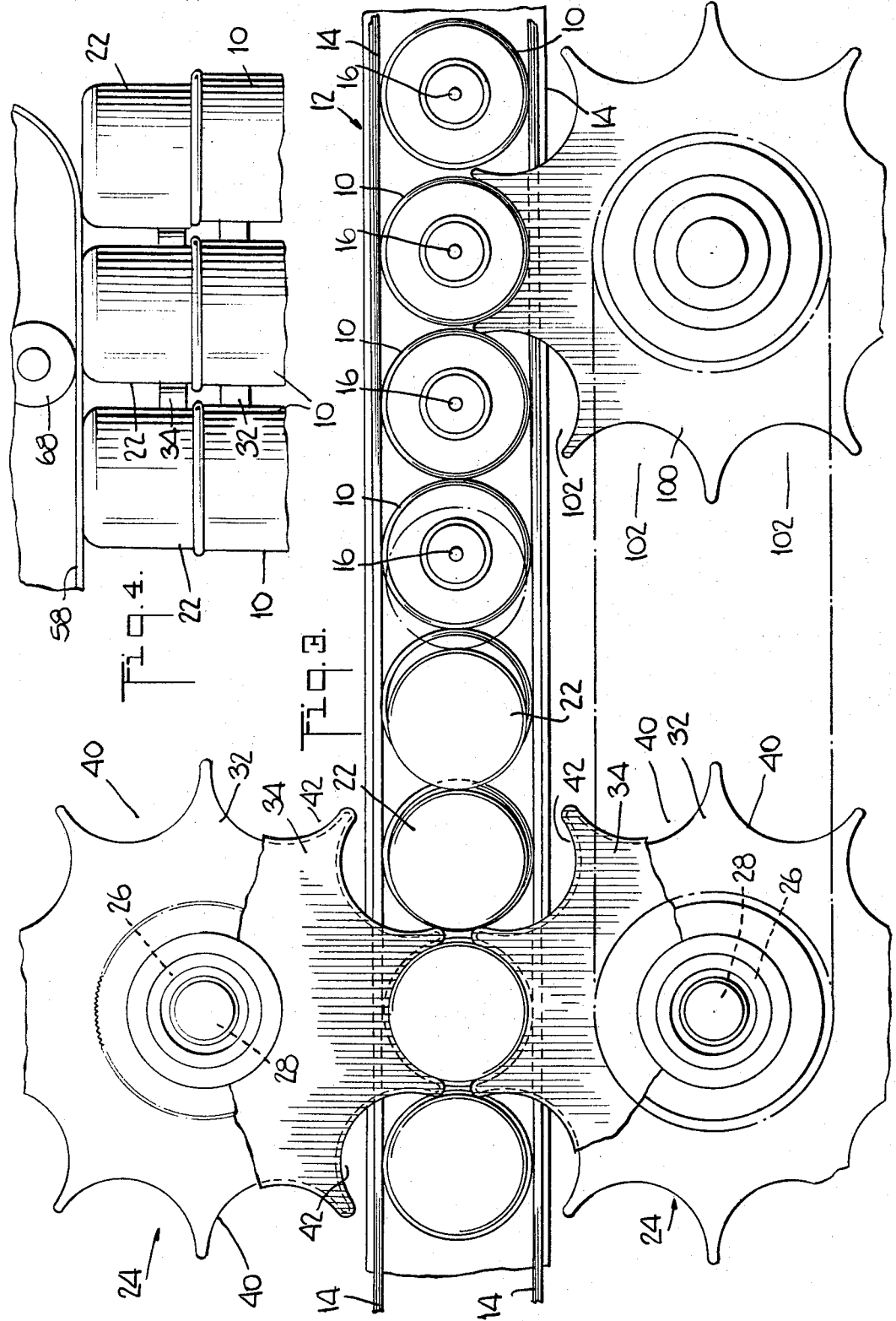

3,382,646
CAPPER
Richard A. Leudtke, Racine, Wis., and Dick E. Milholland, Amstelveen, Netherlands, assignors to S. C. Johnson & Son, Inc., Racine, Wis.
Filed Mar. 10, 1966, Ser. No. 533,143
13 Claims. (Cl. 53—128)

This invention relates to automatic packaging and more particularly it concerns the rapid application of caps to individual containers.

The present invention is particularly useful in the aerosol industry wherein actuator overcaps having a large outside diameter must be applied to containers of not much larger diameter. In general, the caps are made of molded plastic and are provided with a beaded lower edge which snaps into place in a corresponding groove in the top of a metal container when the cap is pressed down on it. It is important, of course, that the cap be properly aligned to the container before it is pressed down, otherwise one or both of these elements will be damaged in the pressing operation. In the past, it has been difficult to obtain proper alignment of the caps and containers where the containers were filled and moved along at a rapid rate. It has been proposed to feed the cap from a support chute having a frictional or resilient constraining means at its outlet. The chute outlet would be located such that an upper protrusion, e.g., the aerosol valve stem, at the top of each container, would intercept the cap at the outlet of the chute and pull it out from the chute as the container moved by. This arrangement however is unsatisfactory for situations where the cap diameter is much larger than the upper protrusion on the container. In such case, the cap would lag the container, since the centrally located upper protrusion or valve stem would contact and line up with the outer wall of the large diameter cap. Because of this, capping had to be done either by hand or by very complicated and expensive machinery. In most cases, this machinery was of the rotary type which meant that containers had to be taken off from their conveyor line and loaded into the capping machine and then returned to the conveyor line.

The present invention permits the rapid and accurate alignment and securing of caps to containers with a simple and inexpensive arrangement. The capping technique of the present invention moreover permits containers to remain in their conveyor line so that no handling problems are introduced.

According to the present invention, containers to be capped are moved in succession along a conveyor line. Caps for the containers are fed successively to the containers at a given location along the line. Just downstream of this location, star wheels are provided alongside the conveyor line. These star wheels include upper and lower star wheel elements formed with aligned peripheral recesses which accommodate respectively, each container and its associated cap. As the container and cap move along past the star wheels, the star wheel elements rotate together and the cap and container move more deeply into their respective recesses, whereupon they become fully aligned with each other. Presser means such as a slightly inclined overhead belt is provided just downstream from the star wheels to press down upon the aligned cap and snap it into place on its respective container.

According to a further feature of the invention, the containers are moved along in close or touching side by side relationship and the caps are similarly fed to the containers via an overhead gravity feed chute. The outlet of the feed chute is unrestricted so that the caps may freely flow out from the chute. The caps however are restricted in their forward movement in that they abut up against one another between the feed chute and the star wheel alignment mechanism. This provides a preliminary or "coarse" alignment of each cap to a container so that the caps and containers may move more easily into their respective star wheel elements for final alignment. As a result of this arrangement, capping may be achieved with machinery which is far less complex and therefore more economical than conventional capping machinery. The capping machinery of the present invention moreover, operates far more rapidly than prior capping machinery.

The present invention in another of its aspects involves the provision of a cap presser means comprising a carriage supporting two belt pulleys which are displaced along the container conveyor line above and downstream from the star wheel alignment mechanism. A presser belt is looped over the pulleys. The carriage is adjustable both as to height and inclination and indicator means are provided to set the presser belt so that it will engage a container and cap as they become aligned and will press the cap down on the container as they proceed downstream from the alignment means.

Spacer star wheel means are also provided upstream of the alignment star wheels, and this serves to maintain a smooth flow of containers through the alignment star wheels and thus avoid jamming and misalignment.

There has thus been outlined rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the specification, wherein:

FIG. 3 is a view, partially cut away taken along line 3—3 of FIG. 1; and

FIG. 4 is an enlarged fragmentary view of a portion of the machine as shown in FIG. 1.

Figure 1:
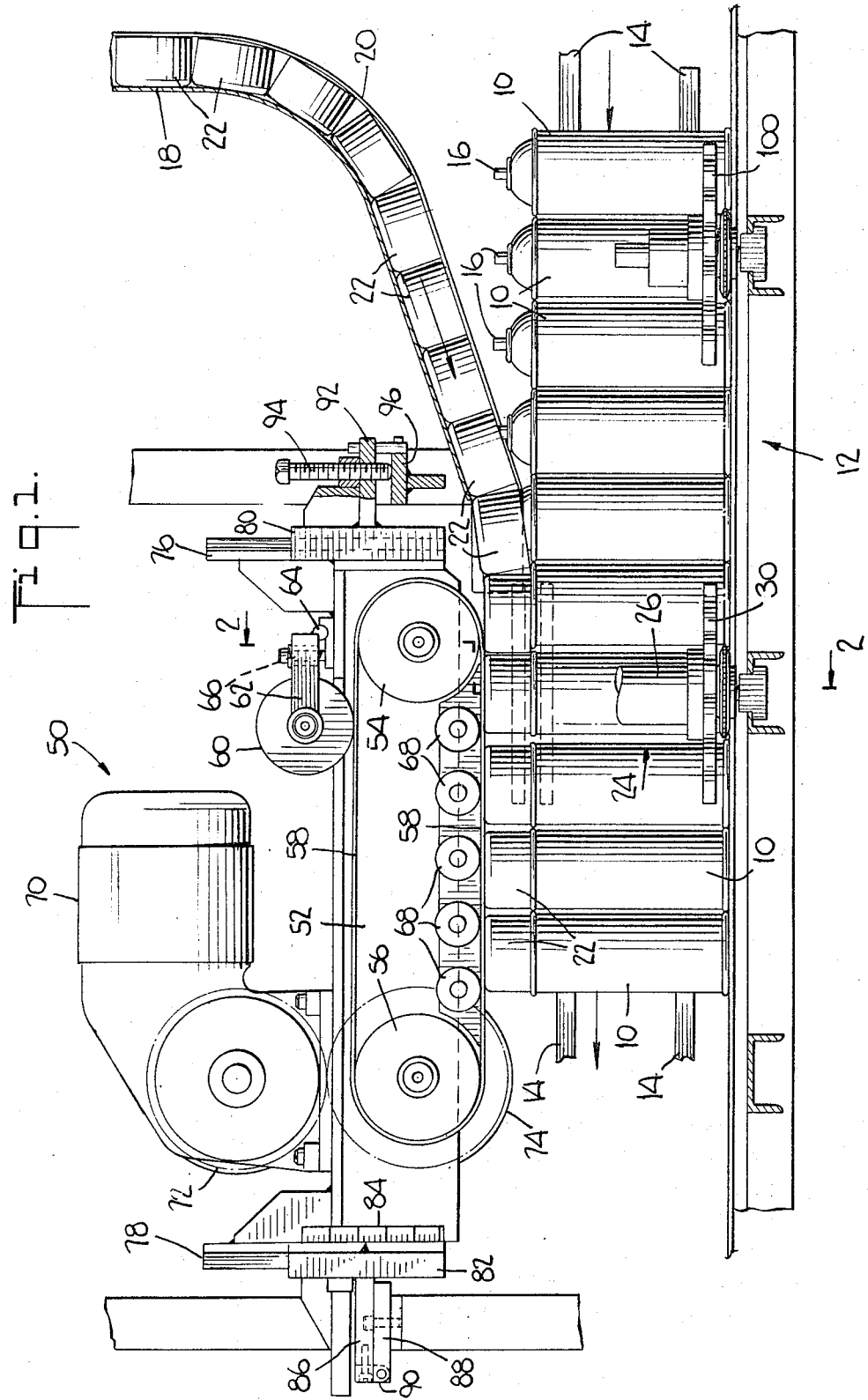
FIG. 1 is a side elevation of a capping machine embodying the present invention.

As shown in FIG. 1, a plurality of aerosol containers 10 are moved along a conveyor bed 12 from right to left in succession and in close side by side relationship to one another. Guide rails 14 extend horizontally above the bed 12 and serve to maintain the containers in upright orientation and in single file as they move along.

The containers, it will be noted, are of generally cylindrical configuration and they are formed with upwardly protruding, centrally positioned valve stem means 16, which, when depressed, permit discharge of the contents of the container.

A cap feed chute 18 extends downwardly from above the containers 10. The chute curves, as shown at 20, so that it merges tangentially with the tops of the containers 10. A plurality of overcaps 22 are supplied from a source (not shown) and they proceed down through the chute 18 in abutting side by side relationship to the top of the containers 10. The outlet of the chute 18 is completely unrestricted so that the overcaps 22 are free to move down onto the tops of the containers 10. It will be noted that this distinguishes from prior cap feed chute arrangements which utilized some frictional or resilient restraint at the chute outlet to hold the caps in the chute until they become pulled out one by one by the tops of the moving containers.

Figure 2:
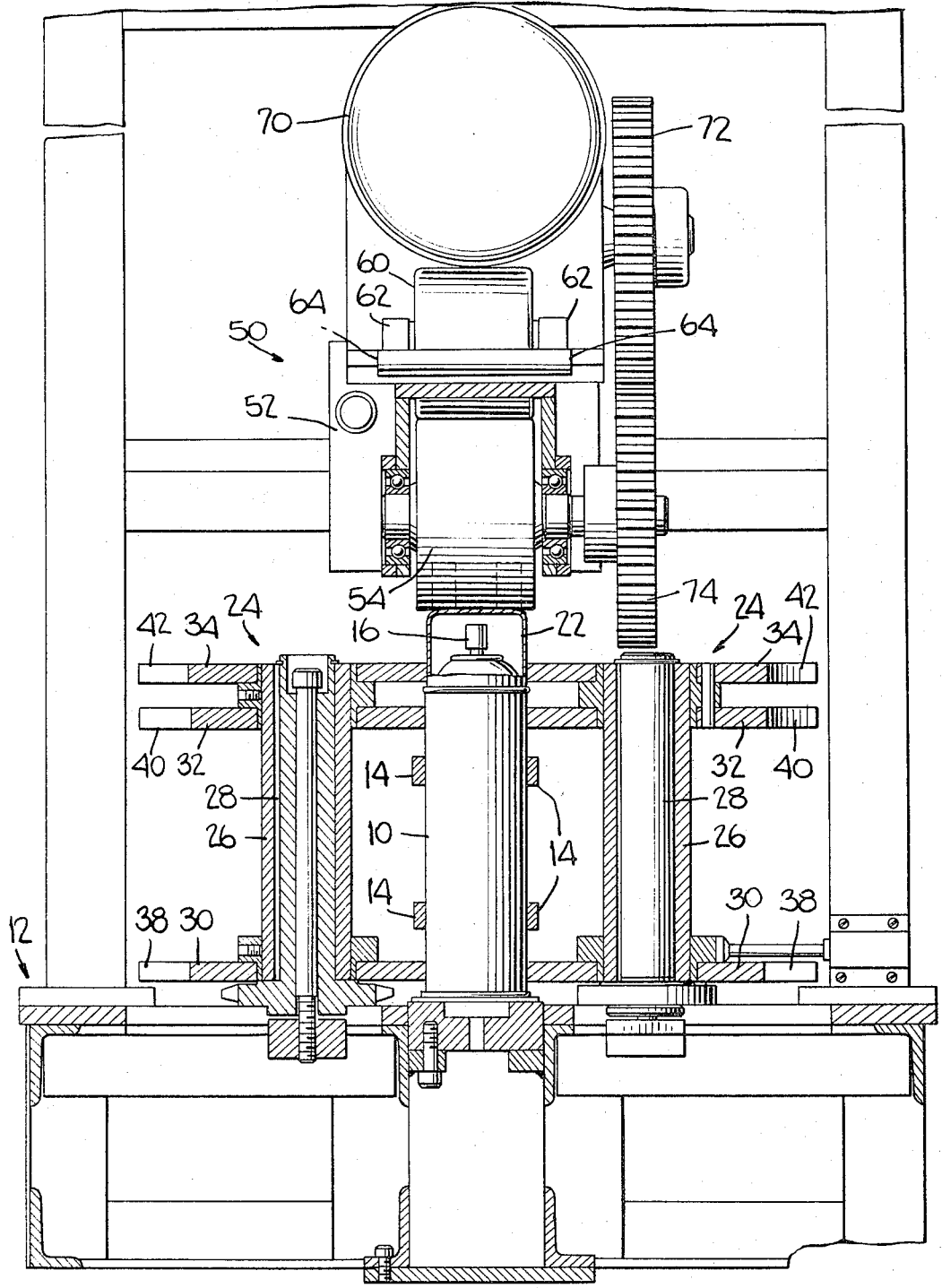
FIG. 2 is a section view taken along line 2—2 of FIG. 1.

As shown in FIGS. 1 and 2, there are provided a pair of star wheel alignment members 24 which are positioned on opposite sides of the bed 10, just downstream of the outlet of the cap feed chute 18. The star wheel alignment members 24 each include a spindle 26 mounted on bearing means 28 to rotate about vertical axes parallel to and on opposite sides of the containers 12. Lower, intermediate and upper star wheel alignment elements 30, 32 and 34 are fitted onto each spindle 26 and secured thereto by means of set screw 36.

Turning now to FIG. 3, it will be seen that the star wheel alignment elements are formed with a series of peripheral recesses shown at 38, 40 and 42, respectively. The recesses 42 in the upper elements 34 are curved in accordance with the outer diameters of the overcaps 22, while the recesses 40 and 38 in the intermediate and lower elements 32 and 30 are curved in accordance with the outer diameter of the containers 10. Thus, it will be noted that the recesses 42 in the upper element 34 are somewhat smaller in size than the recesses 40 and 38 in the intermediate and lower elements 32 and 30, since, as can be seen in FIG. 4, the outer diameter of the overcaps 22 is somewhat less than the outer diameter of the containers 10. The alignment elements 30, 32 and 34 are set on each spindle 26 such that each recess is aligned with corresponding recesses on the other alignment elements, and they are positioned such that these recesses meet tangentially with the containers 10 and caps 22 as they proceed along the conveyor bed 12.

A presser assembly 50 is mounted above the bed 12 above and downstream of the star wheel alignment members 24. The presser assembly 50 includes a carriage frame 52 which extends lengthwise of the bed 12 and which mounts forward and rearward belt pulleys 54 and 56. A presser belt 58 extends around both pulleys and is maintained in tension by means of an idler roller 60 which presses down on the belt 58 from above. The idler roller is mounted on one end of each of a pair of idler support arms 62. These arms are secured at their other ends to the carriage frame 52 by means of pivots 64. A spring bias element 66 is connected between the carriage frame 52 and an intermediate location on the arms 62 and serves to pull down upon the arms, thus causing the idler roller 60 to press down upon and to maintain a taught condition in the presser belt 58.

A plurality of presser rollers 68 are mounted alongside each other and are distributed between the belt pulleys 54 and 56. These rollers 68 press down along the inside surface of the lower half of the presser belt 58, so that in this region the belt behaves as a solid movable element.

A belt drive motor 70 is mounted on top of the carriage frame 52 and is connected by means of gears 72 and 74 (FIG. 2) to drive the presser belt 58 so that its lower half moves in the direction of the containers 10.

The carriage frame 52 is provided with forward and rearward vertically extending mounting plates 76 and 78. These mounting plates fit in grooved relation with and are movable vertically with respect to corresponding forward and rearward vertical adjustment plates 80 and 82. Scale and indicator means 84 are provided on the mounting and adjustment plates; and these are calibrated to indicate the height of the presser belt 58 above the conveyor bed 12. Setscrew means (not shown) may be provided to secure each mounting plate at a given vertical position with respect to its associated adjustment plate.

A pivot plate 86 extends rearwardly back from the rearward adjustment plate 82. A rear support 88 is pivotally connected at 90 to the pivot plate 86; and this rear support in turn is secured to the conveyor bed 12.

A pivotal adjustment plate 92 extends forwardly out from the forward vertical adjustment plate 80. A pivotal adjustment screw 94 is threaded through the pivotal adjustment plate 92 and bears down against a front support 96. The front support in turn is secured to the conveyor bed 12.

A synchronizing star wheel 100 is mounted alongside of the conveyor bed 12 on the upstream side of the star wheel alignment members 24. The synchronizing star wheel 100 is of the same configuration as the lower and intermediate star wheel alignment elements 30 and 32 and, as shown in FIG. 3, is provided with peripheral recesses 102 of the same size as the recesses 38 and 40, of the alignment elements 30 and 32. Synchronizing means (shown in phanton outline), such as a belt or chain, are provided to maintain a proper relationship between the rotation of the synchronizing star wheel 100 and that of the star wheel alignment members 24.

The system thus far described operates in the following manner: Aerosol containers are caused to move in a line along the conveyor bed 12. As they so move, they pass the spacer star wheel 100 and enter into its recesses 102, thus causing the wheel to turn as the containers pass by. This in turn causes the synchronizing means to turn at least one of the star wheel alignment members 24. In the meantime, the overcaps 22 are gravity fed down the feed chute 18 and proceed out through its lower end and on to the stops of the containers 10.

It will be noted, and can be seen in FIG. 1, that the overcaps are not pulled out of the chute 18 individually by the containers 10, but instead they proceed freely out of the end of the chute and abut up against the overcap resting on the next preceding container. In this manner, the overcaps become prealigned or partially aligned with their respective containers. As can be seen in FIG. 3, the containers closest to the alignment members 24 have their overcaps most nearly aligned; but because of the difference between the outer diameters of the overcaps and containers, the amount of misalignment becomes greater back toward the chute outlet. It will be appreciated that the location of the chute outlet should not be too great a distance upstream from the alignment members 24, in order that the maximum misalignment will not be so excessive as to prevent each overcap from at least resting upon an associated container.

As the alignment members 24 turn, the recesses 38, 40 and 42 in their star wheel alignment elements form pockets which close simultaneously about each individual container and its associated overcap. The container and overcap are thus brought from partial misalignment into full and complete alignment as they pass between the alignment members 24.

While each container and overcap passes through and becomes aligned by the alignment members 24, the overcap 22 engages the presser belt 58 which allows the overcap and container to pass thereunder but which at the same time provides a suitable amount of downward pressure to prevent the overcap from slipping laterally into misalignment with respect to its associated container. The positional relationship between the presser belt 58, the alignment elements 30, 32 and 34, and the overcap 22 and container 10 at this point is best seen in FIG. 4.

The pressure belt 58 is inclined slightly from the horizontal; and as a result its downward force on the overcap 22 gradually increases as the overcap and container proceed downstream under the belt. Eventually, the overcap is pressed down so that its bead snaps into place in the peripheral recess at the top of the container and the capping operation is then complete. The capped container then proceeds to a storage or packing station without further handling and without any change in speed of movement.

The accurate positioning of the presser belt 58 necessary to achieve the above described capping operation is, of course, easily achieved with the mounting arrangement previously described. This is done by loosening the forward and rearward mounting plates 76 and 78 with respect to the forward and rearward adjustment plates 80 and 82. The carriage frame 52 is then adjusted vertically until the scale and indicator means 84 show that the belt height above the conveyor bed 12 corresponds to the height of the top of an overcap on a fully capped container. The adjustment and mounting plates are then secured to each other. The pivotal adjustment screw 94 is then turned, causing the carriage frame 52 to swing about the pivot 90 as the front end of the frame is raised until the forward portion of the presser belt 58 in the vicinity of the alignment members 24 is at a height corresponding to the height of the top of an overcap resting on top of a container prior to being pressed into place.

The synchronizing star wheel 100 serves to absorb the back pressure of containers 10 proceeding toward the capping device, thus preventing jamming and excessive misalignment in the vicinity of the alignment members 24 and the feed chute 18.

It will be appreciated that the capping apparatus of the present invention is of simple construction and yet is capable of rapidly and accurately aligning caps to containers and securing these caps in place. The containers meanwhile proceed along in a straight line substantially unimpeded and requiring no special handling.

Although a particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A capping device comprising conveyor means for causing containers to be capped to move in succession along a given path, cap chute means arranged to feed caps in succession to said containers as they reach a given location along said path, star wheel alignment means positioned alongside of said path on the downstream side of said given location, said star wheel alignment means including plural star wheel elements formed with aligned peripheral recesses which pass over said path in tangential relationship therewith upon rotation of the elements, said recesses being shaped to receive respectively, a container and a cap from said given location, whereby said cap and container become aligned upon passing by said star wheel alignment means, and means located on the downstream side of said alignment means to secure each cap to its respective container.

2. A capping device as in claim 1 wherein said conveyor means is arranged to move said containers therealong in substantially touching side by side relationship and said chute means is arranged to feed said caps in substantially touching side by side relationship, whereby there is maintained at said star wheel alignment means an aligned container and cap which serves to produce a preliminary alignment at said given location.

3. A capping device as in claim 2 wherein said cap chute means is arranged such that the caps proceeding therefrom merge with the tops of containers moving along said conveyor means.

4. A capping device as in claim 2 wherein the outlet of said cap chute means is free of restrictions which restrict free movement of caps out from said chute means.

5. A capping device as in claim 4 wherein said cap chute means extends downwardly toward said conveyor means from above to permit gravity feed of said caps.

6. A capping device as in claim 1 wherein said star wheel alignment means comprises upper and lower star wheel elements mounted on a common spindle and formed with mutually aligned peripheral recesses shaped and positioned to engage respectively a cap and corresponding container moving along said conveyor.

7. A capping device as in claim 1 wherein said star wheel alignment means includes two lower star wheel elements located one above the other to maintain upright stability to containers during the alignment operation.

8. A capping device as in claim 1 wherein said star wheel alignment means includes two sets of star wheel elements located respectively on opposite sides of said conveyor in close alignment whereby the recess of the elements on opposite sides of said conveyor cooperate to define pockets which close upon and open to release containers and caps passing along said conveyor means thereby providing positive positioning of said caps and containers.

9. A capping device as in claim 1 and further including a synchronizing star wheel positioned upstream from said star wheel alignment means, to engage and rotate with the movement of said containers, and synchronizing means causing said star wheel alignment means to turn with the turning of said synchronizing star wheel.

10. A capping device as in claim 1 wherein said cap securing means comprises an elongated belt mounted to move above said conveyor means downstream from said star wheel alignment means, and means mounting said belt to move in a downstream direction at a slight incline to press down upon caps with a gradually increasing pressure as said containers move downstream.

11. A capping device as in claim 10 wherein said mounting means comprises a carriage frame having two belt pulleys mounted thereon with said belt looped over said pulleys, means mounting said carriage frame for pivotal movement at one end and means for achieving incremental vertical adjustments of the opposite end of said carriage.

12. A capping device as in claim 11 further including drive means mounted on said carriage for driving said belt in synchronism with the movement of containers along said conveyor means.

13. A capping device comprising a conveyor arranged to move containers in a line along a given path, a cap feed chute arranged to feed caps in abutting relation down toward said line of containers in a manner such that the caps merge with said containers as they proceed out from said chute, the outlet of said cap chute being free of restrictions to free flow of said caps, star wheel alignment means positioned on opposite sides of said conveyor slightly downstream from the outlet of said feed chute, said star wheel alignment means on each side of said conveyor including star wheel elements having vertically aligned peripheral recesses shaped and positioned to define pockets which close upon caps and associated containers respectively as they pass along said conveyor between said star wheel alignment means to effect full alignment of each cap to its associated container, and a presser belt arranged on overhead pulleys mounted to cause said belt to engage and press down upon each cap as it becomes fully aligned and to gradually increase the downward pressure on said cap as it moves downstream to secure said cap in place on said container.

References Cited

UNITED STATES PATENTS

| | | | |
|---|---|---|---|
| 2,361,366 | 10/1944 | Bell | 53—314 |
| 2,750,722 | 6/1956 | Ferguson et al. | 53—315 X |
| 2,821,823 | 2/1958 | Wahl | 53—316 X |
| 3,018,593 | 1/1962 | Nelson | 53—313 X |
| 3,124,916 | 3/1964 | Anderson et al. | 53—314 X |
| 3,137,982 | 6/1964 | Decker et al. | 53—316 |

WILLIAM W. DYER, JR., *Primary Examiner.*

ROBERT L. FARRIS, *Assistant Examiner.*